United States Patent
Sicher et al.

(10) Patent No.: US 6,385,195 B2
(45) Date of Patent: *May 7, 2002

(54) ENHANCED INTERWORKING FUNCTION FOR INTERFACING DIGITAL CELLULAR VOICE AND FAX PROTOCOLS AND INTERNET PROTOCOLS

(75) Inventors: Alan Eric Sicher, Westmount (CA); Ola Melander, Wuerselen (DE)

(73) Assignee: Telefonaktiebolaget L M Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/897,304

(22) Filed: Jul. 21, 1997

(51) Int. Cl.[7] .................................................. H04B 7/00
(52) U.S. Cl. .................... 370/356; 370/328; 370/465; 370/466
(58) Field of Search .............................. 370/327, 328, 370/338, 465, 468, 536, 356, 466, 467, 469, 470; 455/426, 450, 455, 509, 517; 379/100.01, 100.12, 100.13

(56) References Cited

U.S. PATENT DOCUMENTS

| | | | | |
|---|---|---|---|---|
| 5,491,565 A | * | 2/1996 | Naper | 379/100.01 |
| 5,608,786 A | * | 3/1997 | Gordon | 370/352 |
| 5,610,910 A | | 3/1997 | Focsaneanu et al. | 370/351 |
| 5,726,764 A | * | 3/1998 | Averbuch et al. | 379/100.01 |
| 5,742,905 A | * | 4/1998 | Pepe et al. | 370/401 |
| 5,802,465 A | * | 9/1998 | Hamalainen et al. | 370/338 |
| 5,805,301 A | * | 9/1998 | Rasanen | 370/536 |
| 5,872,845 A | * | 2/1999 | Feder | 379/100.01 |
| 5,881,064 A | * | 3/1999 | Lin et al. | 370/395 |
| 5,896,369 A | * | 4/1999 | Warsta et al. | 370/338 |
| 5,953,322 A | * | 9/1999 | Kimball | 370/328 |

FOREIGN PATENT DOCUMENTS

| | | |
|---|---|---|
| EP | 0740445 A2 | 10/1996 |
| EP | 0773630 A1 | 5/1997 |
| WO | WO 96/20553 | 7/1996 |
| WO | WO 96/29808 | 9/1996 |
| WO | WO 96/34341 | 10/1996 |
| WO | 97/10668 | * 3/1997 |
| WO | WO 97/14234 | 4/1997 |
| WO | WO 97/16938 | 5/1997 |
| WO | WO97/16993 | * 5/1997 |
| WO | WO 97/20424 | 6/1997 |
| WO | WO 97/22212 | 6/1997 |
| WO | WO 97/23988 | 7/1997 |
| WO | WO 97/16916 | 5/1999 |

OTHER PUBLICATIONS

ANSI/TIA/EIA–810–A–2000, pp. 1–55, Dec. 19, 2000.*
Varma et al., Architecture for Interworking Data over PCS, IEEE, pp. 124–130, Sep. 1996.*

(List continued on next page.)

Primary Examiner—Wellington Chin
Assistant Examiner—Frank Duong
(74) Attorney, Agent, or Firm—Smith, Danamraj & Youst, P.C.

(57) ABSTRACT

An enhanced interworking function (E-IWF) supports a method of direct digital interworking between a radio telecommunications network and standard Internet Protocol (IP) routers. A general purpose interworking function performs speech transcoding and data interworking. A specific translation interworking function translates directly between mobile-specific voice encoding and Voice-over-IP protocols, and between mobile-specific fax encoding and Fax-on-IP protocols. The method provides interworking between cellular protocols in a time division multiple access (TDMA) cellular telecommunications network, and Internet protocols being utilized by an Internet End-System (ES) or fax gateway.

19 Claims, 5 Drawing Sheets

OTHER PUBLICATIONS

Chang et al., Architecture Alternative for Wireless Data Services: Interworking with Voiceband Modem, IEEE, pp. 1–8, Sep. 1996.*

"MICOM Voice/IP Gateway to Interoperate with Microsoft NetMeeting 2.0 for Off–Net Calling"; News Release; Apr. 28, 1997.

* cited by examiner

ENHANCED INTERWORKING FUNCTION FOR INTERFACING DIGITAL CELLULAR VOICE AND FAX PROTOCOLS AND INTERNET PROTOCOLS

BACKGROUND OF THE INVENTION

1. Technical Field of the Invention

This invention relates to radio telecommunication systems and, more particularly, to a system and method of interfacing digital mobile radio voice and fax protocols with Internet Protocols.

2. Description of Related Art

Recently, Internet (Internet Protocol (IP)-based) telephone products and services have been introduced that promise enhanced speech quality and connectivity to other Internet subscribers and to regular (non-IP) telephone subscribers. With increases in Internet bandwidth and the deployment of enhanced IP-based, real-time protocols (RTP) and reservation protocols (RSVP), the Internet is poised to eventually offer the type of speech quality that standard land-line subscribers have come to expect. These developments are not just limited to the public internet, but apply to private intranets and Local Area Networks (LANs) as well.

The Internet already offers broadcast and multicast capabilities (through MBONE routers) that have the potential to emulate conference call services. Other computer telephony features using the Internet are now finding their way into commercially available software applications.

Existing radio telecommunication systems such as the Global System for Mobile Communications (GSM, Time Division Multiple Access (TDMA) systems such as the Digital Advanced Mobile Phone System (D-AMPS) (IS-136), Code Division Multiple Access (CDMA) (IS-95) systems, and Personal Communication Services (PCS) systems all utilize digital speech codecs for the transmission of speech information, and have all specified support for a digital asynchronous circuit-mode data service utilizing an Interworking Function (IWF). The standards for these systems are hereby incorporated by reference herein. The role of the IWF is to provide a translation function between the specialized data protocols used by the radio telecommunication systems and the standard land-line data protocols. More specifically, the IWF provides translation functions between the digital radio link protocols (RLP) and land-line analog modems, Integrated Services Digital Network (ISDN) terminals, terminal adapters, and packet data networks. Functions performed in the IWF include rate adaptation between the transmission rate over the air interface and the transmission rate over the land lines. Thus, the IWF performs flow control, error control, sequence control, data buffering, encryption, compression, etc.

The existing IWF, however, does not perform interworking functions between mobile-specific voice encoding protocols on the mobile radio side of a connection and Voice-over-Internet Protocol (Voice-over-IP) encoding protocols (sometimes referred to as Voice-on-Net or VON) on the Internet side of the connection. Likewise, the existing IWF does not perform interworking functions between mobile-specific fax encoding protocols on the mobile radio side of a connection and Fax-on-Internet Protocol (Fax-on-IP) encoding protocols on the Internet side of the connection.

Although there are no known prior art teachings of a solution to the aforementioned deficiency and shortcoming such as that disclosed herein, several references discuss subject matter that bears some relation to matters discussed herein. European Patent Application EPO 740 445 A2 discloses a method and system for establishing voice communications using a computer network. However, this reference discusses communications with the Internet only from landline telephone networks. There is no teaching or suggestion of an enhanced IWF for interfacing mobile terminals directly with the Internet.

PCT Patent Application WO 96120553 discloses a unified messaging and communication system which utilizes the global Internet to link multiple local landline telephone networks. This reference discusses communications with the Internet only from landline telephone networks. There is no teaching or suggestion of an enhanced IWF for interfacing mobile terminals directly with the Internet.

PCT Patent Application WO 96/29808 discloses a system and method of simultaneously transmitting voice and data on shared voice telephone lines. The system permits a single computer or a plurality of computers to be connected to a central computer network using existing telephone wires which continue to provide the normal voice access to the Public Switched Telephone Network (PSTN). This reference discusses communications with the Internet only from landline telephone networks. There is no teaching or suggestion of an enhanced IWF for interfacing mobile terminals directly with the Internet.

PCT Patent Application WO 96/34341 discloses a message storage and delivery system which is connected to a plurality of direct inward dialing (DID) phone lines and receives facsimile messages, voice messages, and data messages. The messages are stored in memory and converted to hyper-text mark-up language (HTML) for transmission over the Internet. Users can access the message storage and delivery system either though the telephone network or the Internet. However, this reference discusses communications with the Internet only from landline telephone networks. There is no teaching or suggestion of an enhanced IWF for interfacing mobile terminals directly with the Internet.

Review of each of the foregoing references reveals no disclosure or suggestion of a system or method such as that described and claimed herein.

In order to overcome the disadvantage of existing solutions, it would be advantageous to have an enhanced IWF (E-IWF) for performing interworking functions between mobile-specific voice encoding protocols and Voice-over-IP encoding protocols as well as performing interworking functions between mobile-specific fax encoding protocols and Fax-on-IP encoding protocols. Such an E-IWF would provide a means for a mobile station to interface voice and fax with the Internet, directly or indirectly through an E-IWF that may be associated with a mobile switching center (MSC). The present invention provides such an enhanced IWF.

SUMMARY OF THE INVENTION

In one aspect, the present invention is an enhanced IWF that supports direct digital interwork between a radio telecommunications network and standard IP networks comprising routers via, for example, an Ethernet (CSMA/CD IEEE 802.3) interface. The present invention supports speech transcoding and data interworking within a general purpose IWF, and provides specific translation from the specialized air-interface encoding methods (e.g. Vector Sum Excitation Linear Predictive (VSELP) vocoders, Adaptive Codebook Excitation Linear Predictive (ACELP) vocoders such as an Alternate Full Rate (AFR) codec standardized in IS-641, GSM Enhanced Full Rate (GSM-EFR), etc.) directly to Voice-over-IP protocols. In different embodiments, this is accomplished with or without an intermediate pulse code modulation (PCM) or analog conversion.

In another aspect, the present invention is a method of supporting direct digital interwork between a radio telecommunications network and standard Internet Protocol (IP) routers. The method comprises the steps of performing speech transcoding and data interworking with a general purpose interworking function, and translating between specialized air-interface encoding methods and Voice-over-IP protocols with a specific translation interworking function.

In yet another aspect, the present invention is a method of interworking between cellular voice protocols in a time division multiple access (TDMA) cellular telecommunications network, and Internet protocols being utilized by an Internet End-System (ES). The method begins by encoding a voice signal from a mobile station in one of the cellular voice protocols, creating a voice frame from the encoded voice signal, interleaving the voice frame into one or more TDMA bursts, and transmitting the TDMA bursts over a radio link to a base station. The voice frame is multiplexed in the base station and transmitted to the E-IWF. This is followed by transcoding the voice frame in a first codec into an isochronous stream of digitized voice samples, transcoding the stream of digitized voice samples in a second codec into a Voice-over-IP service data unit (SDU), and framing the SDU with a transport layer protocol. The step of transcoding the voice frame in a first codec into an isochronous stream of digitized voice samples such as PCM or adaptive differential pulse code modulation (ADPCM). The framed SDU is then carried by a data link layer network interface and physical layer transmission media. The method then interfaces with an Internet Service Provider (ISP).

In yet another aspect, the present invention is a method of interworking between cellular fax protocols and Internet protocols, the cellular fax protocols being utilized by a mobile station in a time division multiple access (TDMA) cellular telecommunications network to transmit an image to a far-end fax machine via the Internet, and the Internet protocols being utilized by a fax gateway. The method begins by originating a mobile fax call, setting up a Radio Link Protocol (RLP) for communicating between the mobile station and the cellular telecommunications network, and scanning, encoding, and compressing the image into a fax data stream. This is followed by sending a sequence of digitized call establishment signals between an enhanced interworking function (E-IWF) in the cellular telecommunications network and the far-end fax machine, formatting the fax data stream into User Datagram Protocol (UDP) frames and segmenting the frames into Internet Protocol (IP) datagrams, and transmitting the UDP/IP datagrams over the Internet to the fax gateway. The method then performs the steps of converting, in the fax gateway, the UDP/IP datagrams into fax modem voiceband information, sending the fax modem voiceband information to the far-end fax machine, and recreating the image in the far-end fax machine.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

The preferred embodiment is described herein in terms of an implementation in an IS-136 TDMA radio telecommunications network such as the Digital Advanced Mobile Phone System (D-AMPS). However, the enhanced interworking function (E-IWF) of the present invention is also applicable to other cellular and personal communication services PCS) systems such as, for example, GSM, CDMA, Pacific Digital Cellular (PDC), Personal Handy System (PHS), Digital Enhanced Cordless Telephony (DECT), third generation wideband systems, and various satellite systems such as Globalstar, Iridium, etc. In addition, the functions performed by the present invention not only interface with the Internet, but also support interfacing with corporate intranets.

Figure 1:
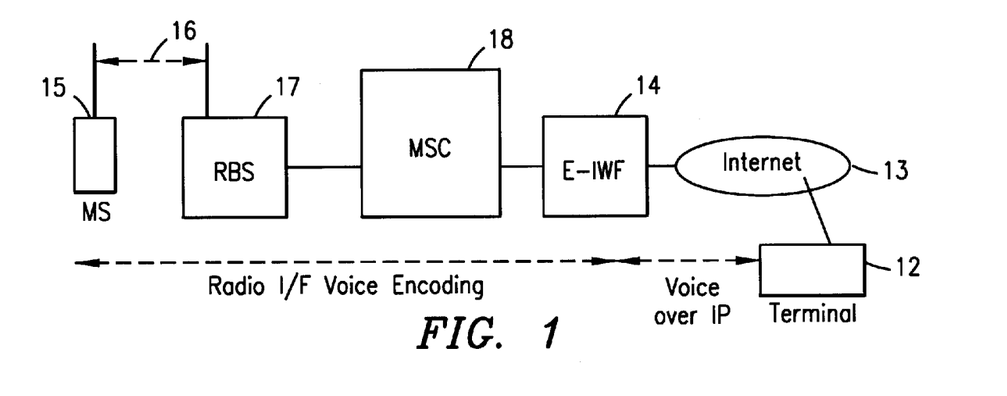
FIG. 1 is a simplified block diagram of a connection of a mobile terminal to a terminal on the Internet utilizing voice protocols and the enhanced interworking function (E-IWF) of the present invention.

FIG. 1 is a simplified block diagram of a connection of a mobile terminal 11 to a terminal (end-system or host) 12 on the Internet 13 utilizing the E-IWF 14 of the present invention. The E-IWF 14 enables a mobile subscriber to make an IS-136 (digital) voice call to another Internet subscriber or to a landline terminal via an IP-based network (for example, the Internet) without going through the PSTN and an extra analog conversion. The connection involves interworking between two different voice codecs and the protocol layers below the voice layer.

In FIG. 1, a mobile station (MS) 15 communicates via radio frequency transmissions 16 to a radio base station (RBS) 17. Data are encoded and transmitted in the radio frequency transmissions 16 in accordance with various air interface standards. The RBS 17 is connected to a mobile switching center (MSC) 18 via cables, microwave links, or other suitable means known in the art. The MSC is associated with the E-IWF 14 which provides the interworking necessary to translate from the specialized air-interface encoding methods directly to Voice-over-IP encoding utilized for data transmissions over the Internet 13. Although FIG. 1 shows the E-IWF 14 implemented with the MSC 18, it may also be implemented as a stand alone node or connected to the RBS 17.

Figure 2:
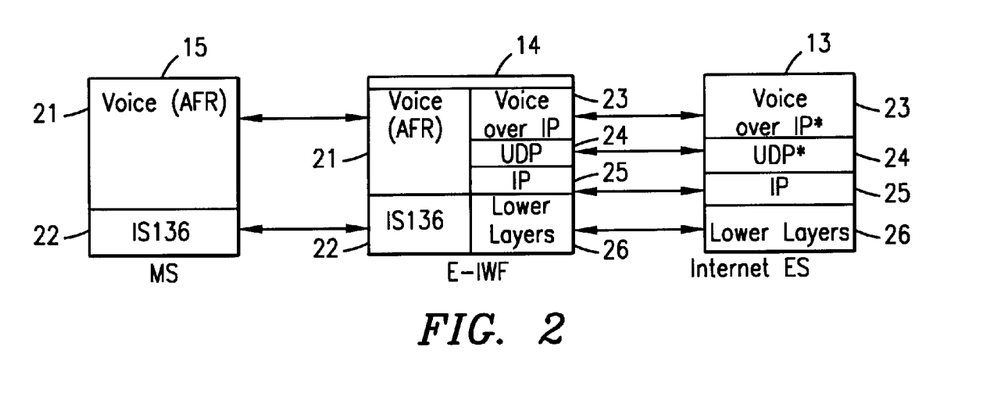
FIG. 2 is a communications protocol stack illustrating the communications protocols utilized, and the protocol translations performed while making the connection of FIG. 1 for a mobile terminal operating in a TDMA radio telecommunication system.

FIG. 2 is a communications protocol stack illustrating the communications protocols utilized, and the protocol translations performed while making the connection of FIG. 1 for a mobile terminal operating in a TDMA radio telecommunication system. Various protocol stacks, which relate loosely to the Open Systems Interconnection (OSI) layers 1–7 are shown for the MS 15, the E-IWF 14, and the Internet 13. Within the MS 15, air-interface voice frames 21 are formatted according to an IS-136 layer 22 which relates to the lower OSI layers (i.e., the physical layer and part of the link layer). The voice frames are formed by a mobile digital voice codec utilizing techniques such as, for example, Adaptive Codebook Excitation Linear Predictive (ACELP) or other digital voice codecs. In FIG. 2, the voice frames are shown as Alternate Full Rate (AFR) frames. The AFR codec is an ACELP codec utilized in IS-136 TDMA systems as an alternate to Vector Sum Excitation Linear Predictive (VSELP).

The voice frames 21 are transmitted via radio link to the RBS 17 and then to the MSC 18 without changing the protocol stack. The E-IWF 14 includes some Radio Base Station (RBS) functionality, and may be partially implemented in the RBS 17. In the E-IWF 14, the voice frames 21 are directly mapped to a corresponding Voice-over-IP protocol 23, a User Datagram Protocol (UDP) layer 24, and an Internet Protocol (IP) layer 25. The UDP layer 24 and the IP layer 25 relate loosely to OSI layers 4 and 3, respectively. If direct mapping of the voice frames 21 to the Voice-over-IP protocol 23 is not possible due to translation complexity, then alternately an intermediate PCM or ADPCM conversion may be utilized. This is discussed in more detail below. The E-IWF 14 also translates the IS-136 layer 22 to lower layers 26 which relate to OSI layers 1–2.

Formats at each level are determined from the industry standards for the respective protocols that make up that level. For example, the Voice AFR protocol is specified in IS-641, and the VSELP protocol is is specified in IS-54 and IS-136. Today, the Voice-over-IP is typically a proprietary speech encoding algorithm although some encoding techniques are based on the standard G.728 (e.g., MICOM). There are two or three commonly used algorithms, and the E-IWF 14 translates between the mobile digital voice frames, such as Voice AFR 21, and these commonly used algorithms. The UDP and IP protocols are, like Voice AFR, also specified in industry standards. While IS-136, AFR, and UDP protocols are shown, these are exemplary only, and other similar protocols may be utilized. Additionally, landline multimedia standards relevant to the present invention include H.323, H.324, and T.120. These standards describe multimedia conferencing control and discipline, but may be applied to voice calls over the Internet. These standards, along with IS-54, IS-641, and G.728 are hereby incorporated by reference herein.

There are several alternative methods of translating between Voice AFR and the three commonly used Voice-over-IP algorithms. The simplest method is to utilize an intermediate PCM conversion so that there are successive AFR-to-PCM and PCM-to-Voice-over-IP conversions within the E-IWF 14. Another method is to utilize voice encoding mapping directly between the Voice AFR voice encoding algorithm and the Voice-over-IP voice encoding algorithm. This works well when the two codecs are derived from the same codec family.

Another method is for the E-IWF 14 to preserve the contents of the Voice AFR frame and place it on top of the UDP and IP layers 24 and 25. An identical codec as the one utilized to encode the Voice AFR frame is then utilized for decoding on the Internet side of the connection. In this method, there is no translation of the voice frames required; the frames are carried transparently. The interworking occurs primarily on the layers below.

Table 1 below provides examples of protocols at each OSI layer, including the Internet Protocol (IP) and other associated protocols.

TABLE 1

| Application | File Transfer | Electronic Mail | Terminal Emulation |
| --- | --- | --- | --- |
| Presentation | File Transfer | Simple Mail | Telnet Protocol |
| Session | Protocol (FTP) | Transfer Protocol (SMTP) | |
| Transport | Transmission Control Protocol (TCP) | | User Datagram Protocol (UDP) |
| Network | Address Resolution Protocol (ARP) | Internet Protocol (IP) | Internet Control Message Protocol (ICMP) |
| Data Link | ---Network Interface Cards--- CSMA/CD (Ethernet), token ring, Frame Relay, Fiber Distributed Data Interface (FDDI), ATM | | |
| Physical | ---Transmission Media--- Wire pair, fiber optics, coaxial cable, radio | | |

Figure 3:
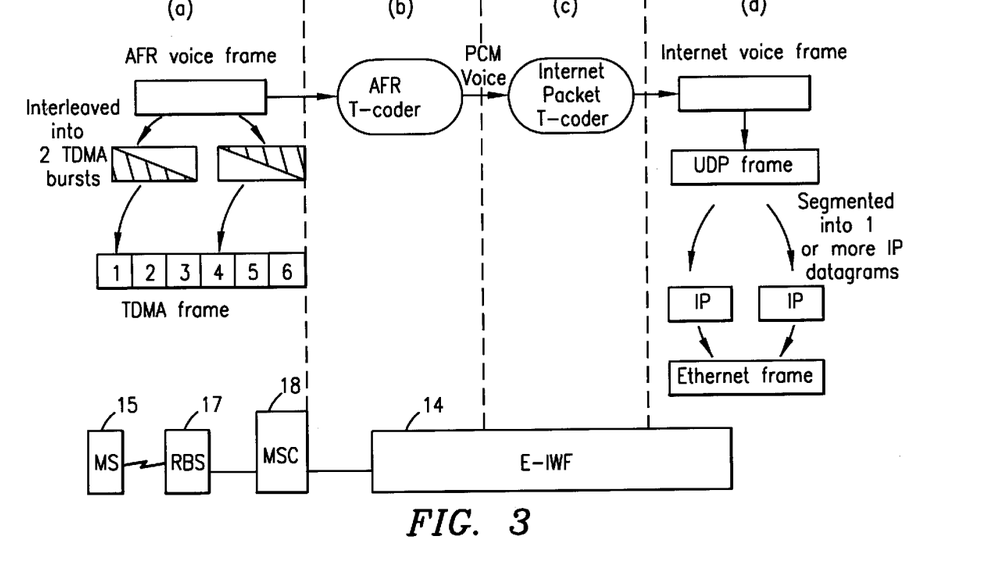
FIG. 3 is a process diagram illustrating the steps of the method of the present invention when interworking between cellular voice protocols and Internet protocols.

FIG. 3 is a flow chart illustrating the steps of the method of the present invention when interworking between cellular voice protocols and Internet protocols. The method is illustrated for transmissions from the mobile station 15 to the Internet 13, but also works for transmissions the other direction.

In step (a), the mobile station 15 encodes the users voice according to an industry standard. In this example, IS-641 (AFR) is utilized. A 20 ms voice frame is created which is interleaved with other frames into two TDMA bursts according to IS-136. The TDMA bursts are transmitted over the radio link 16 to the RBS 17. The radio link is terminated at the RBS, and the voice frame is multiplexed and transported via the MSC 18 to the E-IWF 14. This transport may be conducted utilizing proprietary methods or one of several known RBS-to-MSC physical/link transport technologies such as Frame Relay or Asynchronous Transfer Mode (ATM) on T-1.

In step (b), the E-IWF 14 receives the voice AFR frames and inputs the frames into a first codec which transcodes the frames according to the voice coding algorithm specified in IS-641. At this point, the output from the transcoding function is PCM or adaptive differential PCM (ADPCM) voice characterized by a 64 or 32 kbps isochronous stream of digitized voice samples.

In step (c), the PCM or ADPCM stream is input into a second voice codec in the E-IWF which transcodes the stream into Voice-over-IP format 23 utilizing a commonly used speech encoding algorithm found in products such as Vocaltec, MICOMs V/IP (and other products based on the G.728 standard), Netspeak Webphone, and NetPhone NETphone products. The output of the second codec is a service data unit (SDU) which is a block of data to be handled by a lower layer.

In step (d), the SDU is framed utilizing, for example, a UDP or Transmission Control Protocol (TCP) transport layer in accordance with the Internet Task Force (IETF) RFC standards, which are hereby incorporated by reference herein. UDP is preferred since TCP retransmits received errors, which is undesirable for real-time voice. The transport level frame is segmented into IPv4 or IPv6 datagrams, also according to IETF RFC standards. The IP datagram stream is then carried by one of a plurality of lower layer protocols such as, for example, CSMA/CD (Ethernet), Frame Relay, Token Ring, Fiber Distributed Data Interface (FDDI), or ATM, etc.).

The E-IWF 14 then interfaces on the network layer (and lower layers) with an Internet Service Provider (ISP). The ISP access network provides generalized access to the Internet backbone, and also supports tunneling indirectly to corporate intranets. The ISP network may comprise a plurality of Network Access Servers (NAS) and routers providing IP datagram routing, authentication, and firewall functions. Likewise, if cellular/PCS operators desire to integrate the ISP access network functionality fully within a cellular network, the E-IWF of the present invention may directly support the routing, authentication, and firewall functions.

Most Internet codecs are variable rate codecs. However, some cellular voice codecs such as ACELP and VSELP are constant rate codecs. Therefore, the E-IWF 14 must manage speech gaps from the Internet 13 and detect silence from the mobile station 15. In the present invention, the same speech encoding algorithm may be utilized on both the cellular/PCS terminal side of the connection and on the Internet End-System (ES) side. In this case, the E-IWF de-interleaves the speech frames and relays the frames over the appropriate transport layer (e.g. UDP), IP, and link/physical layers appropriate for interfacing to the Internet.

Thus, the E-IWF 14 must handle the latent variability inherent in the Internet. This is especially critical when constant rate codecs are utilized. In one embodiment, the E-IWF 14 maintains a small IWF buffer and generates safe comfort noise speech frames which are transmitted toward the mobile station when no speech frames are available in the buffer, or when no speech frames have been received within the next mobile speech frame interval (every 20 ms for full rate voice in IS-136). The E-IWF 14 also detects silence period frames from the mobile station. This may be accomplished by generating at the mobile station, a voice activity field which is added to each user TDMA frame. Alternatively, the E-IWF may analyze frames received from the mobile station for certain amplitude and speech activity related to codec parameters. The E-lWF may also have built-in support for echo suppression or cancellation, voice activity detection, and comfort noise insertion.

Figure 4:
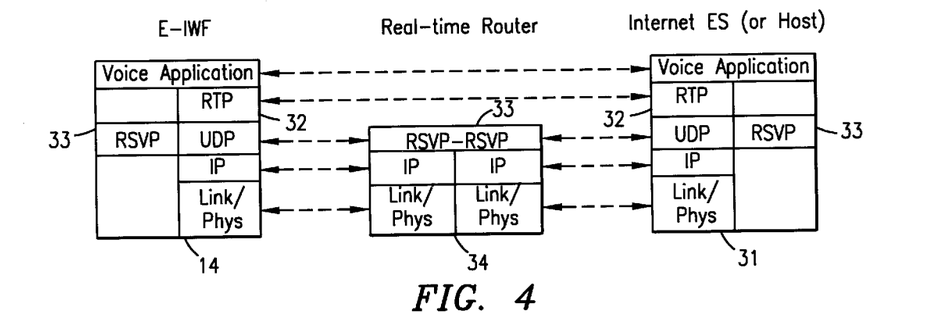
FIG. 4 is a communications protocol stack illustrating a connection between the E-IWF of the present invention and an Internet End-System when utilizing Internet transport protocols providing improved real-time transport of time-sensitive information.

FIG. 4 is a communications protocol stack illustrating a connection between the E-IWF 14 of the present invention and an Internet End-System 31 when utilizing Internet transport protocols providing improved real-time transport of time-sensitive information. A Real Transport Protocol (RTP) 32 is a real-time protocol which is currently being standardized. The RTP protocol runs independently of the network infrastructure and provides payload identification, sequence numbering, time stamping, and delivery monitoring. Thus, the RTP protocol 32 makes a direct connection between the E-IWF 14 and the Internet ES 31 at the session and presentation layers of the OSI protocol stack.

A Reservation Protocol (RSVP) 33 is also currently being standardized. The RSVP protocol may partly take the place of the UDP or TCP protocols. When a host such as the E-IWP 14 or the Internet ES 31 requests a specific Quality of Service (QoS) from the network, the QoS request is made to all routers 34 that lie on a particular ES-to-ES path. The RSVP protocol enables the network to gracefully adapt to certain network conditions.

The present invention also supports interworking between mobile-specific fax encoding protocols on the mobile radio side of a connection and Fax-on-Internet Protocol (Fax-on-IP) encoding protocols on the Internet side of the connection. In existing TDMA systems, instead of supporting fax modulation tones (e.g. V.29) directly through the air-interface voice codecs such as ACELP (which would be subject to severe degradation), TDMA systems support fax applications using a specialized radio link protocol (RLP1) that connects the mobile terminal (MT2) and the Interworking Function (IWF) associated with the MSC. The radio link protocol is defined in IS-130 with supporting datapart AT fax commands defined in IS-135. These standards are hereby incorporated by reference herein. For normal mobile fax calls, the IWF feeds the fax information carried in the RLP frames into an integrated fax modem that communicates with another fax machine connected to the PSTN/ISDN.

On the Internet side of the connection, there are a number of fax IP gateway products on the market that connect the Internet to the PSTN or PBX networks to allow a standard fax machine utilizing Fax-on-POTS (Plain Old Telephone Service) to use the public Internet or a private intranet to transmit fax information to another fax machine or application. The present invention bridges the gap between these fax IP gateway products and the RLP protocol specified in IS-130 and IS-135 for Fax-on-TDMA.

Figure 5:
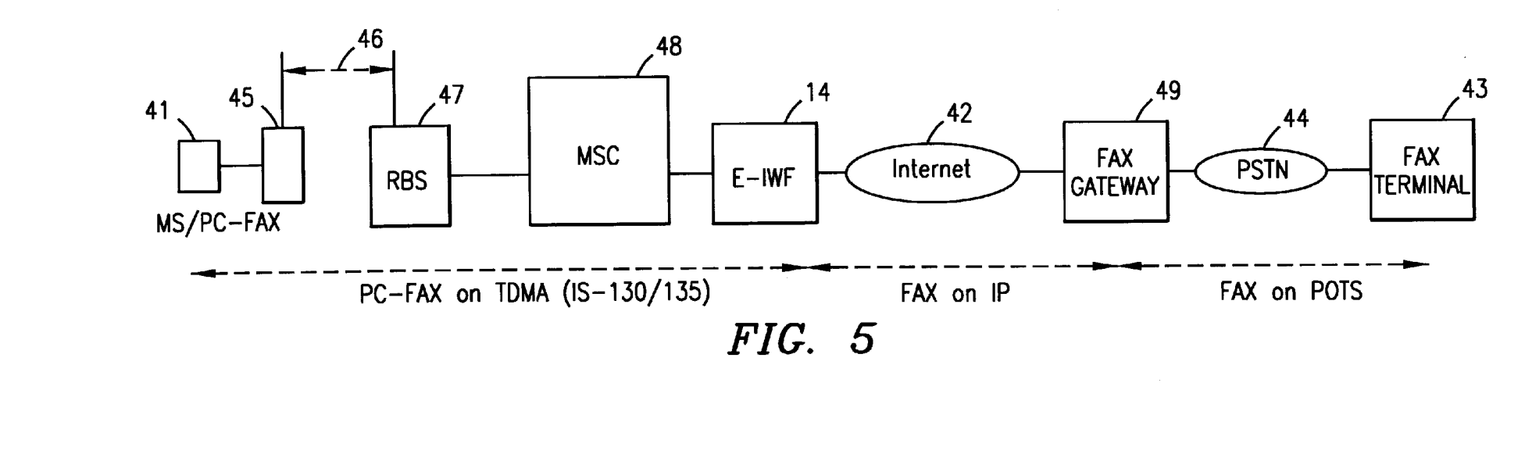
FIG. 5 is a simplified block diagram of a connection of a mobile computer terminal via the Internet to a fax terminal on the PSTN utilizing fax protocols and the enhanced interworking function (E-IWF) of the present invention.

FIG. 5 is a simplified block diagram of a connection of a mobile computer terminal 41 via the Internet 42 to a fax terminal 43 on the PSTN 44 utilizing fax protocols and the enhanced interworking function (E-IWF) 14 of the present invention. The mobile terminal 41 is connected to a mobile station (MS) 45. The MS 45 communicates via radio frequency transmissions 46 to a radio base station (RBS) 47. Data are encoded and transmitted in the radio frequency transmissions 46 in accordance with various air interface standards. The RBS 47 is connected to a mobile switching center (MSC) 48 via cables, microwave links, or other suitable means known in the art. The MSC is associated with the E-IWF 14 which provides the interworking necessary to translate from the specialized air-interface encoding methods directly to Fax-on-IP encoding utilized for data transmissions over the Internet 42. A fax IP gateway 49 allows a standard fax machine to use the public Internet or a private intranet to transmit fax information to another fax machine or application.

Figure 6:
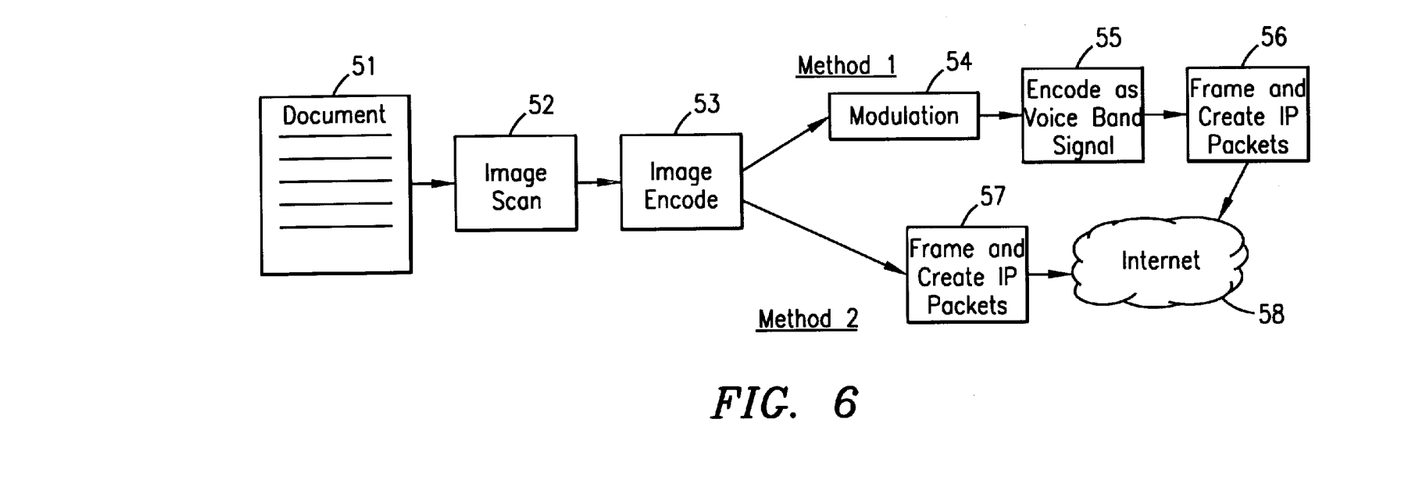
FIG. 6 is a flow chart illustrating the steps of two alternative methods of interworking mobile fax protocols to Fax-on-IP protocols utilized over the Internet.

FIG. 6 is a flow chart illustrating the steps of two alternative methods of interworking mobile fax protocols to Fax-on-IP protocols utilized over the Internet. The first method digitizes and encodes the fax information via a voice band codec, and frames the fax information into UDP frames on IP. The first method treats the fax machine output signal as another voice band signal and digitizes and encodes the signal utilizing a codec which may be, for example, a G.729 codec. The benefit of this approach is that the existing network and fax machine infrastructure can be reused. The second method digitally taps the fax information prior to modulation and directly frames it into UDP frames on IP without going through an analog intermediate step. The second method is more robust from a transmission point of view, but requires that the fax signal be tapped digitally prior to modulation.

Both methods begin when the image of a document 51 is scanned at 52 and encoded at 53. Note that both methods may read and process a saved standard image file (e.g., TIFF, PCX, TCX) rather than scanning an image in real time. Method 1 then proceeds to step 54 where the fax signal is modulated. At 55, the modulated signal is digitized and encoded as a voice band signal. At 56, the encoded voice band signal is framed into UDP frames on IP. Method 2 goes directly from step 53 to step 57 where the encoded image is digitally tapped and directly framed into UDP frames on IP. Both methods then send the IP datagrams over the Internet to the destination.

The E-IWF 14 of the present invention then provides the additional IWF functionality to interwork the specialized RLP (e.g., Fax-on-TDMA) with the output of either of the Fax-on-IP methods of FIG. 6. This allows a mobile user to initiate a fax call to another fax machine or application using the Internet or a private intranet. Three benefits of this approach are:

reduced long-distance fax transmission costs;
shorter transmission and connection times (especially using higher-bandwidth private Intranet links); and
potentially better transmission image quality.

Figure 7:
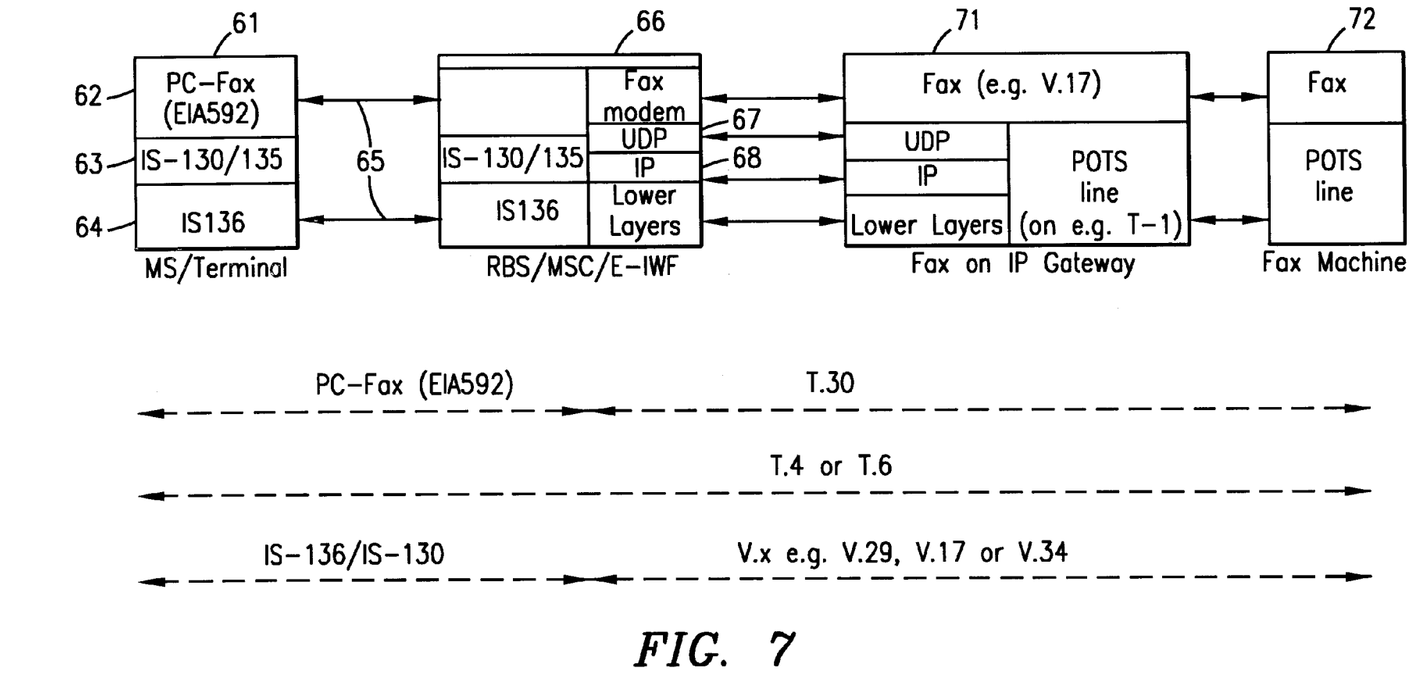
FIG. 7 is a communications protocol stack illustrating a connection of a mobile computer terminal/fax machine to a fax machine via the Internet utilizing fax protocols and the E-IWF of the present invention.

FIG. 7 is a communications protocol stack illustrating a connection of a mobile computer terminal/fax machine to a fax machine via the Internet utilizing fax protocols and the E-IWF of the present invention. The following definitions apply to FIG. 7:

PC-Fax This standard (EIA-592) specifies protocols for use between the terminal (DTE) and the fax modem (DCE). The terminal may control and configure the DCE. In the mobile scenario the DCE is largely included in the IWF.

T.30 This protocol defines the procedures necessary for document transmission between two fax stations in the PSTN. It supports call establishment, release, compatibility checking and supervision of line conditions.

T.4/T.6 These protocols specie the method of image compression and the resulting data format. Several different encoding/compression formats are specified.

V.x These are fax modulation standards that specify the physical layer modulation constellation (based on e.g. QAM), which generates a resultant voice band signal.

These standards and protocols are hereby incorporated by reference herein.

FIG. 7 shows a Mobile Station/Terminal 61 with a fax capability. The MS/Terminal 61 utilizes a protocol stack comprising PC-Fax (EIA-592) 62, an IS-1301135 layer 63, and an IS-136 layer 64. The MS/Terminal communicates over a radio link 65 to a Radio Base Station (RBS) which, for simplicity, is shown combined with an MSC and the E-IWF 14 of the present invention as a single entity 66. This link 65 utilizes the PC-Fax on TDMA (EIA-592) protocol and IS-136 and IS-130. The E-IWF processes the output from the IS-130/135 layers 63 according to the methods of FIG. 6 and places the output into UDP frames 67 carried by IP datagrams on IP layer 68. The UDP frames on IP are sent over the Internet to a Fax-on-IP Gateway 71. The Fax-on-IP Gateway 71 allows a standard fax machine 72 to use the public Internet or a private intranet to transmit fax information to another fax machine or application. The Gateway 71 may be connected to the fax machine 72 through, for example, the PSTN utilizing Fax-on-POTS protocols, via a PBX network, or directly via a cable.

Figure 8:
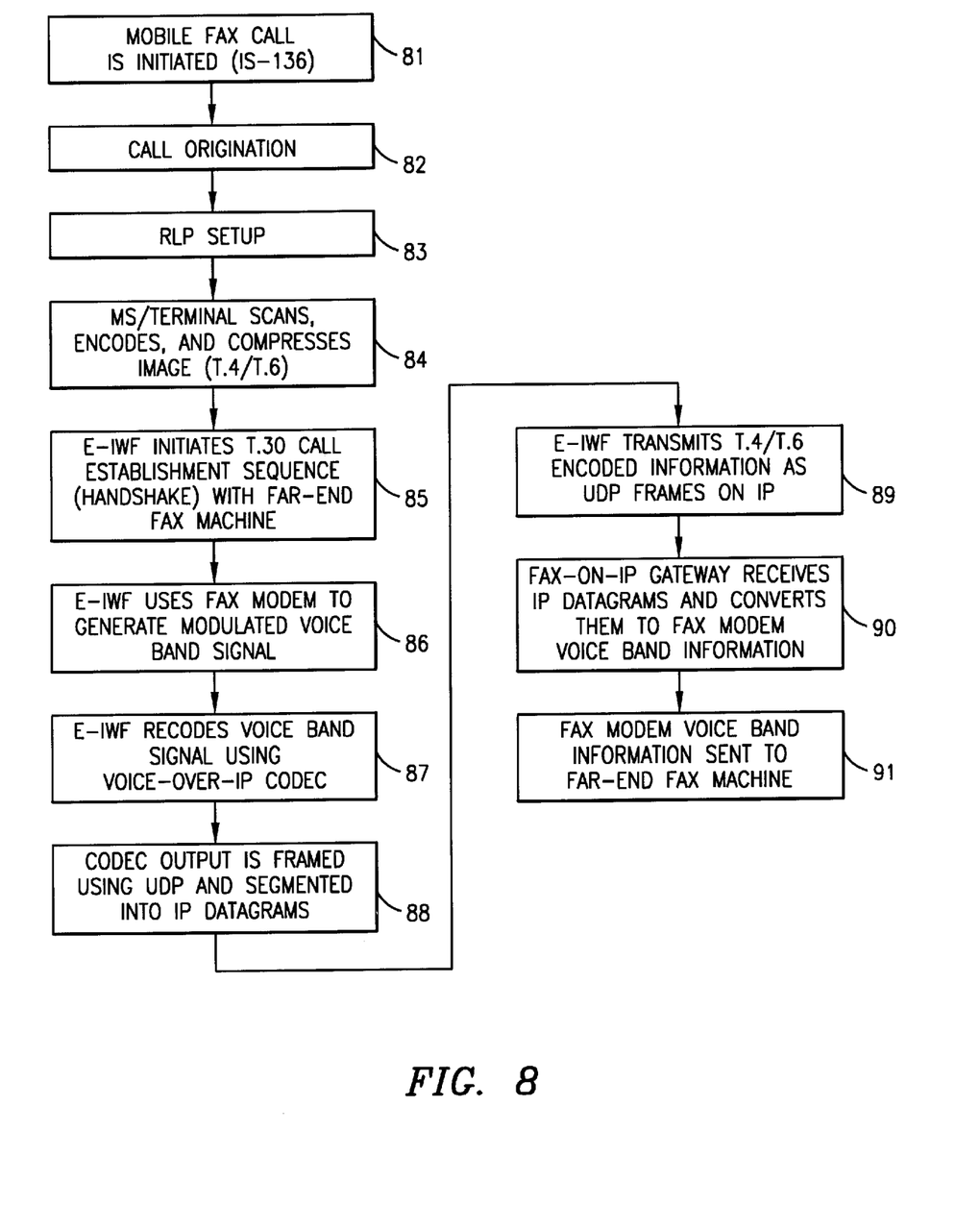
FIG. 8 is a flow chart of the steps utilized to support a mobile Fax-on-IP call.

FIG. 8 is a flow chart of the steps utilized to support a mobile Fax-on-IP call. Referring to FIGS. 6, 7, and 8, a normal mobile fax call is initiated in accordance with IS-135 at step 81. This may include the PC terminal sending the mobile terminal (MT2) 61 a command specifying fax service which triggers a call origination at step 82 and subsequently the setup of the Radio Link Protocol (RLP1 described in IS-130) at 83. In conjunction, the MT2 61 scans, encodes and compresses the image (if required) according to either T.4 or T.6 at step 84. The source image may already be binary, or the PC terminal may already perform the scanning and encoding functions.

At step 85, the E-IWF initiates the T.30 call establishment sequence with the far-end fax machine 72. The sequence includes sending GNG tone, flags, and a facilities setup message. These T.30 tones and commands/responses are sent as voiceband tones modulated by a lower layer modem. At 86, the E-IWF modulates the output from the radio side RLP and the T.30 signaling using one of the standard fax modems (e.g., V.17, V.29). The result is a voice band (e.g., QAM) signal. At 87, the E-IWF re-encodes the voiceband fax modem signal using any standard Voice-over-IP codec (e.g., G.729 used by Micron). Additional silence detection logic may also be employed. The resulting voice coder frames are framed using UDP and are then segmented into IP datagrams at step 88 for transmission on the Internet.

At step 89, prior to, or once the initial handshake of step 85 is complete, the E-IWF transmits the original T.4/T.6 encoded information according to the method in step 88. On the far-end of the fax transmission, the Fax-on-IP gateway 71 receives the IP datagrams at 90 and converts them back to the original fax modem voiceband information. At 91, the fax modem voiceband information may be directly distributed to an existing (off-the-shelf) G3 Fax machine to recreate the document image. Likewise, a special purpose fax application or device may directly interwork with the Fax-on-EP transmission, essentially embedding the fax gateway functionality.

The procedural steps related to method 2 in FIG. 6 does not require steps 86 and 87. Method 2 simply retains the digital encoding and transparently transmits to the other side carried over UDP/IP. The special fax calling/answering tones (GNG, CED), however, are replaced by new digital messages equivalent to the analog setup tones.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. An enhanced interworking function (E-IWF) in a radio telecommunications network that supports direct digital interwork between the radio telecommunications network and standard Internet Protocol (IP) routers, thereby providing a mobile station operating in the radio network with a capability to interface with the Internet, said E-IWF comprising:

a general purpose interworking function within the radio network that performs speech transcoding and data interworking; and     a specific translation interworking function associated with the general purpose interworking function that receives standard radio network signals from the mobile station encoded with a standard air-interface voice encoding method, and translates between the standard air-interface voice encoding method and a Voice-over-IP protocol.

2. The enhanced interworking function of claim 1 wherein said E-IWF is implemented in a Mobile Switching Center (MSC) in the radio network.

3. The enhanced interworking function of claim 1 wherein said E-IWF is implemented in a Radio Base Station (RBS) in the radio network.

4. The enhanced interworking function of claim 1 wherein said specific translation interworking function translates between said standard air-interface voice encoding method and pulse code modulated voice, and between said pulse code modulated voice and said Voice-over-IP protocol.

5. The enhanced interworking function of claim 1 wherein said E-IWF is implemented as a stand-alone node in the radio network.

6. A method of supporting direct digital interwork between a radio telecommunications network and standard Internet Protocol (IP) routers thereby providing a mobile station operating in the radio network with a capability to interface voice traffic with the Internet, said method comprising the steps of:

encoding by the mobile station, standard radio network signals utilizing a standard air-interface voice encoding method;

receiving in the radio network, the encoded standard radio network signals from the mobile station;

performing speech transcoding and data interworking utilizing a general purpose interworking function in the radio network to translate the standard radio network signals into standard land-line data signals; and translating the standard radio network signals into a Voice-over-IP protocol utilizing a specific translation interworking function in the radio network.

7. The method of supporting direct digital interwork of claim 6 wherein said performing and translating steps are performed in an enhanced interworking function (E-IWF), and said method further comprises the step of directly connecting the E-IWF to an Internet End-System (ES) utilizing a real-time protocol (RTP).

8. A method of interworking between standard cellular voice protocols and Internet protocols, said cellular voice protocols being utilized by a mobile station in a time division multiple access (TDMA) cellular telecommunications network, and said Internet protocols being utilized by an Internet End-System (ES), said method comprising the steps of:

encoding a voice signal from said mobile station in one of said standard cellular voice protocols;

creating a voice frame from said encoded voice signal;

interleaving said voice frame into at least one TDMA burst;

transmitting said at least one TDMA burst over a radio link to a base station;

multiplexing said voice frame in said base station;

transmitting said multiplexed voice frame from the base station to an enhanced interworking function (E-IWF) in the cellular network; and performing the following steps in the E-IWF in the cellular network:

transcoding the voice frame in a first codec into an isochronous stream of digitized voice samples;

transcoding the stream of digitized voice samples in a second codec into a Voice-over-IP service data unit (SDU);

framing said SDU into frames with a transport layer protocol;

segmenting said frames into Internet Protocol (IP) datagrams;

carrying said IP datagrams with a data link layer network interface and physical layer transmission media; and interfacing with an Internet Service Provider (ISP).

9. The method of interworking between cellular voice protocols and Internet protocols of claim 8 further comprising supporting echo cancellation and suppression.

10. The method of interworking between cellular voice protocols and Internet protocols of claim 8 further comprising supporting voice activity detection.

11. The method of interworking between cellular voice protocols and Internet protocols of claim 8 further comprising supporting comfort noise insertion.

12. A method of interworking between standard cellular voice protocols and Internet protocols, said cellular voice protocols being utilized by a mobile station in a time division multiple access (TDMA) cellular telecommunications network, and said Internet protocols being utilized by a private intranet, said method comprising the steps of:

encoding a voice signal from said mobile station in one of said standard cellular voice protocols;

creating a voice frame from said encoded voice signal;

interleaving said voice frame into at least one TDMA burst;

transmitting said at least one TDMA burst over a radio link to a base station;

multiplexing said voice frame in said base station;

transmitting said multiplexed voice frame from the base station to an enhanced interworking function (E-IWF) in the cellular network; and performing the following steps in the E-IWF in the cellular network:

transcoding the voice frame in a first codec into an isochronous stream of digitized voice samples;

transcoding the stream of digitized voice samples in a second codec into a Voice-over-IP service data unit (SDU);

framing said SDU into frames with a transport layer protocol;

segmenting said frames into Internet Protocol (IP) datagrams;

carrying said IP datagrams with a data link layer network interface and physical layer transmission media; and interfacing with said private intranet.

13. An enhanced interworking function (E-IWF) in a radio telecommunications network that supports direct digital interwork between the radio telecommunications network and standard Internet Protocol (IP) routers, thereby providing a mobile fax terminal operating in the radio network with a capability to interface fax data with the Internet, said E-IWF comprising:

a general purpose interworking function in the radio network that performs speech transcoding and data interworking; and a specific translation interworking function associated with the general purpose interworking function that receives standard radio network signals from the mobile fax terminal encoded with a standard air-interface fax encoding method, and translates between the standard air-interface fax encoding method and a Fax-on-IP protocol.

14. A method of interworking between standard cellular fax protocols and Internet protocols, said cellular fax protocols being utilized by a mobile fax terminal in a time division multiple access (TDMA) cellular telecommunications network to transmit an image to a far-end fax machine via the Internet, and said Internet protocols being utilized by a fax gateway, said method comprising the steps of:

originating a mobile fax call from the mobile fax terminal;

setting up a Radio Link Protocol (RLP) for communicating between said mobile fax terminal and said cellular telecommunications network;

scanning, encoding, and compressing the image into a standard fax data stream by the mobile fax terminal;

sending a sequence of digitized call establishment signals between an enhanced interworking function (E-IWF) in the cellular telecommunications network and the far-end fax machine;

formatting, in the E-IWF, the fax data stream into User Datagram Protocol (UDP) frames and segmenting the frames into Internet Protocol (IP) datagrams;

transmitting the UDP/IP datagrams over the Internet from the E-IWF to the fax gateway;

converting, in the fax gateway, the UDP/IP datagrams into fax modem voiceband information;

sending the fax modem voiceband information from the fax gateway to the far-end fax machine; and recreating the image in the far-end fax machine.

15. The method of interworking between cellular fax protocols and Internet protocols of claim 14 further comprising, after the step of scanning, encoding, and compressing the image into a standard fax data stream, the steps of:

sending a sequence of call establishment signals between an enhanced interworking function (E-IWF) in the cellular telecommunications network and the far-end fax machine, said signals being sent as voiceband tones modulated by a modem;

modulating information carried by said RLP from said mobile fax terminal with a fax modem to form a voiceband fax modem signal; and re-encoding the voiceband fax modem signal utilizing a Voice-over-IP codec.

16. A system for enabling a mobile fax terminal operating in a radio telecommunications network to communicate with a second fax machine over the Internet, said system comprising:

an enhanced interworking function (E-IWF) within the radio network, said E-IWF comprising:

a general purpose interworking function that performs speech transcoding and data interworking; and a specific translation interworking function associated with the general purpose interworking function that receives standard radio network signals from the mobile fax terminal encoded with a standard air-interface encoding method, and translates between the standard air-interface fax encoding method and a Fax-on-IP protocol; and a Fax-on-IP Gateway connected to said E-IWF, said Fax-on-IP Gateway enabling said second fax machine to communicate with other fax machines over the Internet.

17. The system of claim 16 wherein said specific translation interworking function that translates between said specialized airinterface fax encoding method and said Fax-on-IP protocol includes means for processing data from IS-130/135 layers into User Datagram Protocol (UDP) frames carried by IP datagrams.

18. The system of claim 16 wherein said Fax-on-IP Gateway is connected to said second fax machine through the Public Switched Telephone Network (PSTN) utilizing Fax-on-POTS (Plain Old Telephone Service) protocols.

19. The system of claim 16 wherein said Fax-on-IP Gateway is connected to said second fax machine via a Private Branch Exchange (PBX) network.

* * * * *